(12) United States Patent
Aljama et al.

(10) Patent No.: US 12,722,970 B2
(45) Date of Patent: Sep. 1, 2026

(54) PRODUCING HYDROGEN FROM HYDROGEN SULFIDE

(71) Applicant: Saudi Arabian Oil Company, Dhahran (SA)

(72) Inventors: Hassan A. Aljama, Al Qatif (SA); Ali A. Almofleh, Dammam (SA); Ghulam Shabbir, Dammam (SA); Olatunde O. Onasanya, Dammam (SA)

(73) Assignee: Saudi Arabian Oil Company, Dhahran (SA)

( * ) Notice: Subject to any disclaimer, the term of this patent is extended or adjusted under 35 U.S.C. 154(b) by 667 days.

(21) Appl. No.: 18/193,404

(22) Filed: Mar. 30, 2023

(65) Prior Publication Data

US 2024/0327208 A1 Oct. 3, 2024

(51) Int. Cl.
*C01B 3/04* (2026.01)
*B01D 53/00* (2006.01)
(Continued)

(52) U.S. Cl.
CPC .............. *C01B 3/04* (2013.01); *B01D 53/002* (2013.01); *B01D 53/047* (2013.01); *B01J 6/008* (2013.01);
(Continued)

(58) Field of Classification Search
CPC ..... C01B 3/04; C01B 17/021; C01B 17/0495; C01B 17/168; C01B 2210/0015;
(Continued)

(56) References Cited

U.S. PATENT DOCUMENTS 2,979,384 A 4/1961 Weiner et al.
4,039,613 A 8/1977 Kotera et al.
(Continued)

FOREIGN PATENT DOCUMENTS

CA 2835148 11/2012
CN 100450917 1/2009
(Continued)

OTHER PUBLICATIONS

Alexeeva, "Hydrogen production from thermocatalytic hydrogen sulfide decomposition," Hydrogen Materials Science and Chemistry of Metal Hydrides, NATO Science Series, 71: 49-59, 9 pages.
(Continued)

*Primary Examiner* — Daniel Berns
*Assistant Examiner* — Joshua Maxwell Speer
(74) *Attorney, Agent, or Firm* — Fish & Richardson P.C.

(57) ABSTRACT

A feed stream is heated to a preheat temperature. The feed stream includes hydrogen sulfide. After heating the feed stream, at least a portion of the hydrogen sulfide in the feed stream is converted into hydrogen and sulfur to form a mixed product stream. The mixed product stream includes the hydrogen, the sulfur, and a remaining, unconverted portion of the hydrogen sulfide. The preheat temperature is a temperature that is sufficiently hot to maintain a desired reaction temperature while converting at least the portion of the hydrogen sulfide in the feed stream into hydrogen and sulfur. At least a portion of the mixed product stream is cooled to condense the sulfur to form a sulfur stream. The sulfur stream includes the sulfur that has condensed from the portion of the mixed product stream.

9 Claims, 6 Drawing Sheets

(51) Int. Cl.
*B01D 53/047* (2006.01)
*B01J 6/00* (2006.01)
*C01B 17/02* (2006.01)
*C01B 17/04* (2006.01)
*C01B 17/16* (2006.01)

(52) U.S. Cl.
CPC ........ *C01B 17/021* (2013.01); *C01B 17/0495* (2013.01); *C01B 17/168* (2013.01); *B01D 2257/108* (2013.01); *B01D 2257/304* (2013.01); *B01D 2257/504* (2013.01); *B01D 2259/402* (2013.01); *C01B 2210/0015* (2013.01); *C01B 2210/0051* (2013.01)

(58) Field of Classification Search
CPC ........ C01B 2210/0051; C01B 17/0404; B01D 53/002; B01D 53/047; B01D 2257/108; B01D 2257/304; B01D 2257/504; B01D 2259/402; B01J 6/008
See application file for complete search history.

(56) References Cited

U.S. PATENT DOCUMENTS

| | | | | |
|---|---|---|---|---|
| 5,397,556 | A | 3/1995 | Towler et al. | |
| 5,843,395 | A | 12/1998 | Wang | |
| 6,403,051 | B1 | 6/2002 | Keller | |
| 7,637,984 | B2 | 12/2009 | Adamopoulos | |
| 8,206,669 | B2 | 6/2012 | Schaffer et al. | |
| 8,518,356 | B2 | 8/2013 | Schaffer et al. | |
| 9,255,005 | B2 | 2/2016 | Angelini et al. | |
| 2016/0115026 | A1* | 4/2016 | Angelini .................. | C01B 3/02 422/211 |
| 2021/0245095 | A1 | 8/2021 | Fan et al. | |
| 2024/0132344 | A1 | 4/2024 | Aljama et al. | |

FOREIGN PATENT DOCUMENTS

| | | |
|---|---|---|
| FR | 2982254 | 5/2014 |
| WO | WO 2008137936 | 11/2008 |
| WO | WO2011064468 | 6/2011 |
| WO | WO 2012154041 | 11/2012 |

OTHER PUBLICATIONS

Crevier et al., "Saudi Aramco Eliminates Claus Catalyst Deactivation Caused by Aromatics Using Activated Carbon," IPTC, IPTC 11432, International Petroleum Technology Conference held in Dubai, U.A.E., Dec. 4-6, 2007, 14 pages.
De Crisci et al., "Hydrogen from hydrogen sulfide: towards a more sustainable hydrogen economy." International Journal of Hydrogen Energy, Jan. 2018, 44(3):1299-1327.
Ipsakis et al., "An electrocatalytic membrane-assisted process for hydrogen production from H2S in Black Sea: Preliminary results" International Journal of Hydrogen Energy, Jun. 2015, 40(24):7530-7538, 9 pages.
Kaloidas et al., "Kinetic studies on the catalytic decomposition of hydrogen sulfide in a tubular reactor," Industrial & engineering chemistry research, 1991, 30(2):345-351, 7 pages.
Kwok et al., "Constrained Growth of MoS2 Nanosheets within a Mesoporous Silica Shell and Its Effects on Defect Sites and Catalyst Stability for H2S Decomposition," ACS Catalysis Dec. 2017, 8(1):714-724, 13 pages.

* cited by examiner 110b
113
115b
116b
114b
112b
109
111
110a
107
115a
116a
114a
101
103
105
420
407
414
410
415
412
112a
402
401
403
405
400

PRODUCING HYDROGEN FROM HYDROGEN SULFIDE

TECHNICAL FIELD

This disclosure relates to hydrogen production.

BACKGROUND

Hydrogen sulfide and carbon dioxide exist in various gas streams, including natural gas. Oil or gas that contains significant amounts of sulfur compounds like hydrogen sulfide is considered "sour", and oil refineries and gas processing plants utilize "sweetening" processes to remove such sulfur compounds. A typical sulfur recovery process includes liquid amine absorption and the Claus process. In liquid amine absorption, hydrogen sulfide and carbon dioxide are selectively removed from gas mixtures, and the hydrogen sulfide and carbon dioxide are flowed to the Claus process, which can convert the hydrogen sulfide into elemental sulfur. The Claus process utilizes oxygen to oxidize hydrogen sulfide into sulfur dioxide and water, and the sulfur dioxide reacts with hydrogen sulfide to produce elemental sulfur and water. The carbon dioxide, on the other hand, is typically released into the atmosphere without further use.

SUMMARY

This disclosure describes technologies relating to hydrogen production, and in particular, by decomposition of hydrogen sulfide. Certain aspects of the subject matter described can be implemented as a method. A feed stream is heated to a preheat temperature. The feed stream includes hydrogen sulfide. After heating the feed stream, at least a portion of the hydrogen sulfide in the feed stream is converted into hydrogen and sulfur to form a mixed product stream. The mixed product stream includes the hydrogen, the sulfur, and a remaining, unconverted portion of the hydrogen sulfide. The preheat temperature is a temperature that is sufficiently hot to maintain a desired reaction temperature while converting at least the portion of the hydrogen sulfide in the feed stream into hydrogen and sulfur. At least a portion of the mixed product stream is cooled to condense the sulfur to form a sulfur stream. The sulfur stream includes the sulfur that has condensed from the portion of the mixed product stream.

This, and other aspects, can include one or more of the following features. Multiple pressure swing adsorption beds can receive an acid gas stream. The acid gas stream can include carbon dioxide and hydrogen sulfide. The pressure swing adsorption beds can separate at least a portion of the carbon dioxide from the acid gas stream to produce a carbon dioxide stream and the feed stream. The carbon dioxide stream can include the carbon dioxide that has separated from the acid gas stream. The feed stream can include a remaining portion of the acid gas stream. At least a portion of the carbon dioxide and at least a portion of the remaining, unconverted portion of the hydrogen sulfide can be separated from the mixed product stream to produce a second carbon dioxide stream, a hydrogen sulfide stream, and a second mixed product stream. The second carbon dioxide stream can include the carbon dioxide that has separated from the mixed product stream. The hydrogen sulfide stream can include the hydrogen sulfide that has separated from the mixed product stream. The second mixed product stream can include a remaining portion of the mixed product stream.

The hydrogen sulfide stream can be combined with the feed stream. Heating the feed stream can include heating the hydrogen sulfide stream along with the feed stream. At least a portion of the hydrogen and at least a portion of the hydrogen sulfide can be separated from the second mixed product stream to produce a hydrogen stream, a second hydrogen sulfide stream, and a product stream. The hydrogen stream can include the hydrogen that has separated from the second mixed product stream. The second hydrogen sulfide stream can include the hydrogen sulfide that has separated from the second mixed product stream. The product stream can include a remaining portion of the second mixed product stream. The second hydrogen sulfide stream can be combined with the hydrogen sulfide stream and the feed stream. Heating the feed stream can include heating the second hydrogen sulfide stream along with the hydrogen sulfide stream and the feed stream. Cooling at least a portion of the mixed product stream can include cooling the product stream to condense the product stream and produce the sulfur stream. At least a portion of the hydrogen sulfide in the feed stream can be converted, in the presence of oxygen, to sulfur and sulfur dioxide to form a second feed stream. The sulfur dioxide can react with the hydrogen sulfide to produce additional sulfur. The second feed stream can be cooled to condense sulfur to form a second sulfur stream and a third feed stream. The second sulfur stream can include the sulfur that has condensed from the second feed stream. The third feed stream can include a remaining, gaseous portion of the second feed stream. At least a portion of the sulfur dioxide of the third feed stream can be converted back into hydrogen sulfide to form a fourth feed stream. Converting the portion of the hydrogen sulfide in the feed stream into hydrogen and sulfur can include converting at least a portion of the hydrogen sulfide in the fourth feed stream into hydrogen and sulfur to form the mixed product stream. An oxidizing stream can be heated. The oxidizing stream can include oxygen. The oxygen present while converting at least the portion of the hydrogen sulfide in the feed stream to sulfur and sulfur dioxide can be provided by the oxidizing stream after the oxidizing stream has been heated.

Certain aspects of the subject matter described can be implemented as a system. The system includes a heater, a catalytic reactor, and a condenser. The heater is configured to heat a feed stream to a preheat temperature. The feed stream include hydrogen sulfide. The catalytic reactor is downstream of the heater. The catalytic reactor is configured to receive at least a portion of the feed stream from the heater. The catalytic reactor includes a catalyst. The catalytic reactor is configured to contact the portion of the feed stream with the catalyst. The catalyst is configured to, in response to contact with the portion of the feed stream, convert at least a portion of the hydrogen sulfide in the portion of the feed stream into hydrogen and sulfur to form a mixed product stream. The catalytic reactor is configured to discharge the mixed product stream. The mixed product stream includes the hydrogen, the sulfur, and a remaining, unconverted portion of the hydrogen sulfide. The preheat temperature is a temperature that is sufficiently high to maintain a desired reaction temperature within the catalytic reactor. The condenser is downstream of the catalytic reactor. The condenser is configured to receive at least a portion of the mixed product stream. The condenser is configured to cool the portion of the mixed product stream to condense sulfur to form a sulfur stream. The sulfur stream includes the sulfur that has condensed from the portion of the mixed product stream.

This, and other aspects, can include one or more of the following features. The system can include a separation unit. The separation unit can be upstream of the heater. The separation unit can be configured to receive an acid gas stream. The acid gas stream can include carbon dioxide and hydrogen sulfide. The separation unit can include multiple pressure swing adsorption beds. The pressure swing adsorption beds can be configured to separate at least a portion of the carbon dioxide from the acid gas stream to produce a carbon dioxide stream and the feed stream. The separation unit can be configured to discharge the carbon dioxide stream and the feed stream. The carbon dioxide stream can include the carbon dioxide that has separated from the acid gas stream. The feed stream can include a remaining portion of the acid gas stream. The system can include a separator. The separator can be downstream of the catalytic reactor. The separator can be upstream of the condenser. The separator can be configured to receive the mixed product stream. The separator can be configured to separate at least a portion of the carbon dioxide and at least a portion of the remaining, unconverted portion of the hydrogen sulfide from the mixed product stream to produce a second carbon dioxide stream, a hydrogen sulfide stream, and a second mixed product stream. The separator can be configured to discharge the second carbon dioxide stream, the hydrogen sulfide stream, and the second mixed product stream. The second carbon dioxide stream can include the carbon dioxide that has separated from the mixed product stream. The hydrogen sulfide stream can include the hydrogen sulfide that has separated from the mixed product stream. The second mixed product stream can include a remaining portion of the mixed product stream. The heater can be configured to receive and heat the hydrogen sulfide stream along with the feed stream. The system can include a second separator. The second separator can be downstream of the separator. The second separator can be upstream of the condenser. The second separator can be configured to receive the second mixed product stream. The second separator can be configured to separate at least a portion of the hydrogen and at least a portion of the hydrogen sulfide from the second mixed product stream to produce a hydrogen stream, a second hydrogen sulfide stream, and a product stream. The second separator can be configured to discharge the hydrogen stream, the second hydrogen sulfide stream, and the product stream. The hydrogen stream can include the hydrogen that has separated from the second mixed product stream. The second hydrogen sulfide stream can include the hydrogen sulfide that has separated from the second mixed product stream. The product stream can include a remaining portion of the second mixed product stream. The heater can be configured to receive and heat the second hydrogen sulfide stream along with the hydrogen sulfide stream and the feed stream. The condenser can be configured to receive the product stream. The condenser can be configured to cool and condense the product stream to produce the sulfur stream. The system can include an oxidation reactor. The oxidation reactor can be downstream of the heater. The oxidation reactor can be upstream of the catalytic reactor. The oxidation reactor can be configured to convert, in the presence of oxygen, at least a portion of the hydrogen sulfide in the feed stream to sulfur and sulfur dioxide to form a second feed stream. The system can include a second condenser. The second condenser can be downstream of the oxidation reactor. The second condenser can be upstream of the catalytic reactor. The second condenser can be configured to receive the second feed stream. The second condenser can be configured to cool the second feed stream to condense sulfur to form a second sulfur stream. The condenser can be configured to discharge the second sulfur stream and a third feed stream. The second sulfur stream can include the sulfur that has condensed from the second feed stream. The third feed stream can include a remaining, gaseous portion of the second feed stream. The system can include a hydrogenation unit. The hydrogenation unit can be downstream of the second condenser. The hydrogenation unit can be upstream of the catalytic reactor. The hydrogenation unit can be configured to receive the third feed stream. The hydrogenation unit can be configured to convert at least a portion of the sulfur dioxide of the third feed stream back into hydrogen sulfide to form a fourth feed stream. The hydrogenation unit can be configured to discharge the fourth feed stream. The portion of the feed stream received by the catalytic reactor can be the fourth feed stream. The system can include a preheater. The preheater can be upstream of the oxidation reactor. The preheater can be configured to heat an oxidizing stream comprising oxygen. The oxidation reactor can be configured to receive the oxidizing stream from the preheater.

The details of one or more implementations of the subject matter of this disclosure are set forth in the accompanying drawings and the description. Other features, aspects, and advantages of the subject matter will become apparent from the description, the drawings, and the claims.

DETAILED DESCRIPTION

Figure 1A:
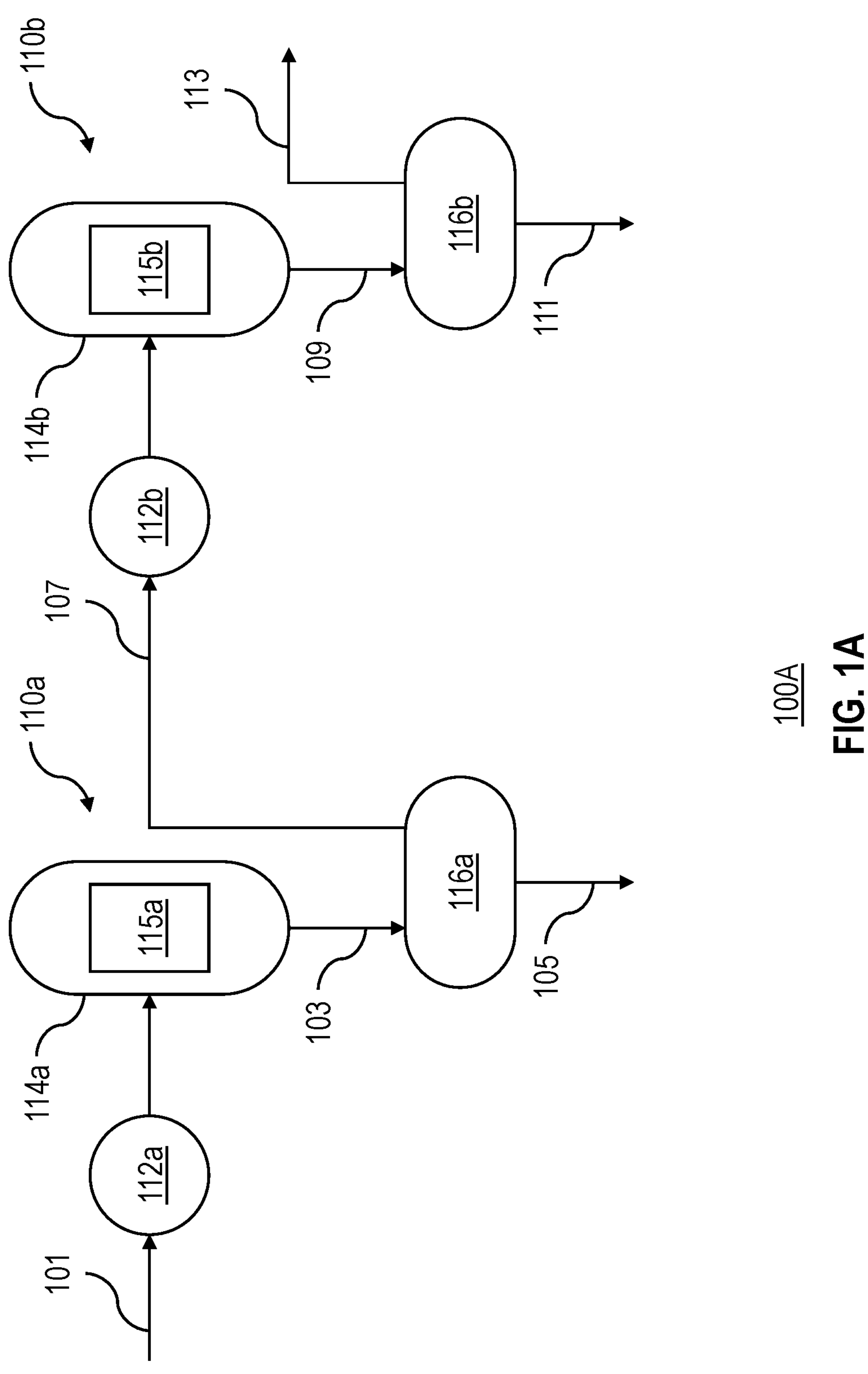
FIG. 1A is a schematic diagram of an example system for producing hydrogen from hydrogen sulfide that includes two reactor trains.

This disclosure describes hydrogen production from decomposition of hydrogen sulfide. The process includes a thermo-catalytic reactor that splits hydrogen sulfide into elemental hydrogen and sulfur. The feed stream includes hydrogen sulfide. For example, the feed stream can be an acid gas stream produced as a byproduct from natural gas processing. The catalyst decomposes the hydrogen sulfide into adsorbed hydrogen atoms and adsorbed sulfur atoms, followed by hydrogen and sulfur gas generation by coupling the adsorbed hydrogen atoms and the adsorbed sulfur atoms, respectively. In contrast to other conventional methods for decomposing hydrogen sulfide (such as the Claus process), the proposed process produces hydrogen gas, which can be useful as a fuel or a feedstock in generating other valuable chemical products. The process can include a pre-heating step to counter the endothermic nature of the hydrogen sulfide decomposition reaction(s). The process can include a post-cooling step to condense and separate the sulfur from the gaseous components. In some implementations, the process includes a separator upstream of the thermo-catalytic reactor for removing co-species from the feed stream to increase a concentration of the hydrogen sulfide in the feed stream. In some implementations, the process includes a separator downstream of the thermo-catalytic reactor for recycling unreacted hydrogen sulfide back to the reactor to increase overall conversion of the hydrogen sulfide into hydrogen and sulfur. In some implementations, the process includes a combustion reactor and a hydrogenation unit upstream of the thermo-catalytic reactor. The combustion reactor can crack impurities in the feed stream and convert at least a portion of the hydrogen sulfide into sulfur and sulfur dioxide. The hydrogenation unit can convert the sulfur dioxide back into hydrogen sulfide, which can then be converted into hydrogen and sulfur in the thermo-catalytic reactor.

The subject matter described in this disclosure can be implemented in particular implementations, so as to realize one or more of the following advantages. The hydrogen originating from the hydrogen sulfide is not simply oxidized to produce water (as it does in the Claus process). Instead, the hydrogen originating from the hydrogen sulfide is a source for producing hydrogen gas, which is a valuable product. The systems and methods described here can be implemented to convert hydrogen sulfide into hydrogen and sulfur without producing carbon dioxide and contributing to greenhouse gas emissions. The systems and methods described here can capture carbon dioxide and either convert or sequester the carbon dioxide such that it does not contribute to greenhouse gas emissions. In some implementations, the systems and methods described here can be implemented free of the use of a furnace, in contrast to the conventional Claus process. Such systems and methods described here do not require an additional air feed stream (which can be required for the conventional Claus process) for the oxygen to react with hydrogen sulfide to form sulfur dioxide, and nitrogen would exit the furnace as an inert stream. Because of the absence of nitrogen in such systems and methods described here, the size of equipment (for example, reactors, heaters, and condensers) can be significantly smaller (for example, by about 40%-60%) in comparison to those required for the conventional Claus process, which can result in both capital and operating cost savings.

FIG. 1A is a schematic diagram of an example system 100A for producing hydrogen from hydrogen sulfide ($H_2S$) that includes two reactor trains 110*a*, 110*b*. The reactor train 110*a* includes a heater 112*a*, a catalytic reactor 114*a*, and a condenser 116*a*. The heater 112*a* is configured to heat a feed stream 101 to a preheat temperature. The feed stream 101 includes hydrogen sulfide. The preheat temperature is a temperature that is sufficiently high to maintain a desired reaction temperature within the catalytic reactor 114*a*. In some implementations, the preheat temperature is in a range of from in a range of from about 450 degrees Celsius (C) to about 900° C. In some implementations, the desired reaction temperature within the catalytic reactor 114*a* is in a range of from about 450° C. to about 900° C. The heater 112*a* can be, for example, a heat exchanger.

In some implementations, the feed stream 101 is (or is derived from) an acid gas resulting from the processing (for example, separation) of natural gas. For example, the feed stream 101 can include carbon dioxide ($CO_2$), water ($H_2O$, ammonia ($NH_3$), a hydrocarbon (such as methane ($CH_4$)), carbon disulfide ($CS_2$), carbonyl sulfide (COS), a volatile aromatic hydrocarbon (such as benzene, toluene, ethylbenzene, and xylene or any isomer thereof (BTEX)), or any combination thereof. In some implementations, the feed stream 101 has an $H_2S$ content in a range of from about 20 volume percent (vol. %) to about 95 vol. %. In some implementations, the feed stream 101 has a $CO_2$ content in a range of from about 5 vol. % to about 75 vol. %. In some implementations, the feed stream 101 has an $H_2O$ content in a range of from 0 vol. % to about 10 vol. % or from about 1 vol. % to about 10 vol. %. In some implementations, the feed stream 101 has an $NH_3$ content in a range of from 0 vol. % to about 10 vol. %. In some implementations, the feed stream 101 has a $CH_4$ content in a range of from 0 vol. % to about 5 vol. %. In some implementations, the feed stream 101 has a COS content in a range of from 0 vol. % to about 5 vol. %. In some implementations, the feed stream 101 has a BTEX content in a range of from 0 vol. % to about 5 vol. %. In some implementations, an operating pressure of the feed stream 101 entering the heater 112*a* is in a range of from about 1 atmosphere to about 5 atmospheres. In some implementations, an operating temperature of the feed stream 101 entering the heater 112*a* is in a range of from about 20° C. to about 50° C.

The catalytic reactor 114*a* is downstream of the heater 112*a*. The catalytic reactor 114*a* is configured to receive at least a portion of the feed stream 101 from the heater 112*a*. The catalytic reactor 114*a* includes a catalyst 115*a*. The catalytic reactor 114*a* is configured to contact the portion of the feed stream 101 with the catalyst 115*a*. The catalyst 115*a* is configured to, in response to contact with the portion of the feed stream 101, convert at least a portion of the hydrogen sulfide in the portion of the feed stream 101 into hydrogen and sulfur to form a mixed product stream 103. In some implementations, the catalytic reactor 114*a* is configured to convert at least about 30%, at least about 40%, at least about 50%, at least about 60%, at least about 70%, or at least about 80% of the hydrogen sulfide in the feed stream 101 into hydrogen and sulfur. The catalytic reactor 114*a* is configured to discharge the mixed product stream 103. The mixed product stream 103 includes the hydrogen produced in the catalytic reactor 114*a* and the sulfur produced in the catalytic reactor 114*a*. In some implementations, the mixed product stream 103 includes a remaining, unconverted portion of the hydrogen sulfide from the portion of the feed stream 101.

In some implementations, the catalyst 115*a* includes a metal sulfide, such as molybdenum sulfide, iron sulfide, or a bi-metal sulfide (such as nickel-doped molybdenum sulfide). In some implementations, the catalyst 115*a* includes an alloy, such as silver-bismuth or a boron-doped metal (for example, boron-doped palladium). In some implementations, the catalyst 115*a* includes a metal oxide, such as vanadium oxide or iron oxide.

The condenser 116*a* is downstream of the catalytic reactor 114*a*. The condenser 116*a* is configured to receive at least a portion of the mixed product stream 103. The condenser 116*a* is configured to cool the portion of the mixed product stream 103 to condense sulfur to form a sulfur stream 105. The condenser 116*a* is configured to cool the portion of the mixed product stream 103 to a temperature that is cooler than the dew point of sulfur. In some implementations, the condenser 116*a* is configured to cool the portion of the mixed product stream 103 to a temperature in a range of from about 120° C. to about 200° C. The condenser 116*a* is configured to discharge the sulfur stream 105. The sulfur stream 105 includes the sulfur that has condensed and separated from the mixed product stream 103. In some implementations, the condenser 116*a* is configured to discharge an outlet gas stream 107. The outlet gas stream 107 can include a remaining, gaseous portion of the mixed product stream 103 after the sulfur has condensed and been separated. For example, the outlet gas stream 107 includes an unconverted portion of the hydrogen sulfide originating from the feed stream 101.

The reactor train 110*b* is downstream of the reactor train 110*a*. The reactor train 110*b* includes a heater 112*b*, a catalytic reactor 114*b*, and a condenser 116*b*. The reactors trains 110*a*, 110*b* can be substantially similar. For example, the heaters 112*a* and 112*b* of the reactor trains 110*a* and 110*b*, respectively, can be substantially similar. As another example, the catalytic reactors 114*a* and 114*b* of the reactor trains 110*a* and 110*b*, respectively, can be substantially similar. As another example, the catalysts 115*a* and 115*b* of the reactor trains 110*a* and 110*b*, respectively, can be substantially similar. As another example, the condensers 116*a* and 116*b* of the reactor trains 110*a* and 110*b*, respectively, can be substantially similar. While similar, the components of the reactor trains 110*a*. 110*b* may vary, for example, in size. While similar, the operating parameters (such as temperature and pressure) of the components of the reactor trains 110*a*, 110*b* may vary. While similar, the specific compositions of the catalysts 115*a*, 115*b* may vary.

The heater 112*b* is downstream of the condenser 116*a*. The heater 112*b* is configured to receive at least a portion of the outlet gas stream 107 from the condenser 116*a*. The heater 112*b* is configured to heat at least the portion of the outlet gas stream 107 to a second preheat temperature. The second preheat temperature is a temperature that is sufficiently high to maintain a desired reaction temperature within the catalytic reactor 114*b*. In some implementations, the second preheat temperature for the heater 112*b* is substantially similar to the preheat temperature for the heater 112*a*. In some implementations, the second preheat temperature is in a range of from in a range of from about 450° C. to about 900° C. In some implementations, the desired reaction temperature within the catalytic reactor 114*b* is in a range of from about 450° C. to about 900° C.

The catalytic reactor 114*b* is downstream of the heater 112*b*. The catalytic reactor 114*b* is configured to receive at least a portion of the outlet gas stream 107 from the heater 112*b*. The catalytic reactor 114*b* includes a catalyst 115*b*. The catalytic reactor 114*b* is configured to contact the portion of the outlet gas stream 107 with the catalyst 115*b*. The catalyst 115*b* is configured to, in response to contact with the portion of the outlet gas stream 107, convert at least a portion of the hydrogen sulfide in the portion of the outlet gas stream 107 into hydrogen and sulfur to form a mixed product stream 109. In some implementations, the catalytic reactor 114*b* is configured to convert at least about 30%, at least about 40%, at least about 50%, at least about 60%, at least about 70%, or at least about 80% of the hydrogen sulfide in the outlet gas stream 107 into hydrogen and sulfur. The catalytic reactor 114*b* is configured to discharge the mixed product stream 109. The mixed product stream 109 includes the hydrogen produced in the catalytic reactor 114*b* and the sulfur produced in the catalytic reactor 114*b*. In some implementations, the mixed product stream 109 includes a remaining, unconverted portion of the hydrogen sulfide from the portion of the outlet gas stream 107.

The catalyst 115*b* can have the same composition as or a different composition from the catalyst 115*a*. In some implementations, the catalyst 115*b* includes a metal sulfide, such as molybdenum sulfide or iron sulfide. In some implementations, the catalyst 115*b* includes an alloy, such as silver-bismuth. In some implementations, the catalyst 115*b* includes a metal oxide, such as vanadium oxide or iron oxide.

The condenser 116*b* is downstream of the catalytic reactor 114*b*. The condenser 116*b* is configured to receive at least a portion of the mixed product stream 109. The condenser 116*b* is configured to cool the portion of the mixed product stream 109 to condense sulfur to form a sulfur stream 111. The condenser 116*b* is configured to cool the portion of the mixed product stream 109 to a temperature that is cooler than the dew point of sulfur. In some implementations, the condenser 116*b* is configured to cool the portion of the mixed product stream 109 to a temperature in a range of from about 120° C. to about 200° C. The condenser 116*b* is configured to discharge the sulfur stream 111. The sulfur stream 111 includes the sulfur that has condensed and separated from the mixed product stream 109. In some implementations, the condenser 116*b* is configured to discharge an outlet gas stream 113. The outlet gas stream 113 can include a remaining, gaseous portion of the mixed product stream 109 after the sulfur has condensed and been separated. For example, the outlet gas stream 113 includes an unconverted portion of the hydrogen sulfide originating from the feed stream 101.

The system 100A can, for example, convert at least about 80%, at least about 85%, or at least about 90% of the hydrogen sulfide from the feed stream 101 into hydrogen and sulfide. In some implementations, the outlet gas stream 113 has a hydrogen ($H_2$) content in a range of from about 15 vol. % to about 90 vol. %. In some implementations, the outlet gas stream 113 has an $H_2S$ content in a range of from 0 vol. % to about 10 vol. %. In some implementations, the outlet gas stream 113 has a $CO_2$ content in a range of from about 5 vol. % to about 75 vol. %. In some implementations, the outlet gas stream 113 has an $H_2O$ content in a range of from 0 vol. % to about 10 vol. %. In some implementations, the outlet gas stream 113 has an $NH_3$ content in a range of from 0 vol. % to about 10 vol. %. In some implementations, the outlet gas stream 113 has a $CH_4$ content in a range of from 0 vol. % to about 5 vol. %. In some implementations, the outlet gas stream 113 has a COS content in a range of from 0 vol. % to about 5 vol. %. In some implementations, the outlet gas stream 113 has a BTEX content in a range of from 0 vol. % to about 5 vol. %. The outlet gas stream 113 can be processed to separate and produce a high purity hydrogen stream. The high purity hydrogen stream can have an $H_2$ content in a range of from about 98 vol. % to about 100 vol. %. For example, the high purity hydrogen stream can have an $H_2$ content of at least about 98 vol. %, at least about 99 vol. %, or at least about 99.9 vol. %.

Figure 1B:
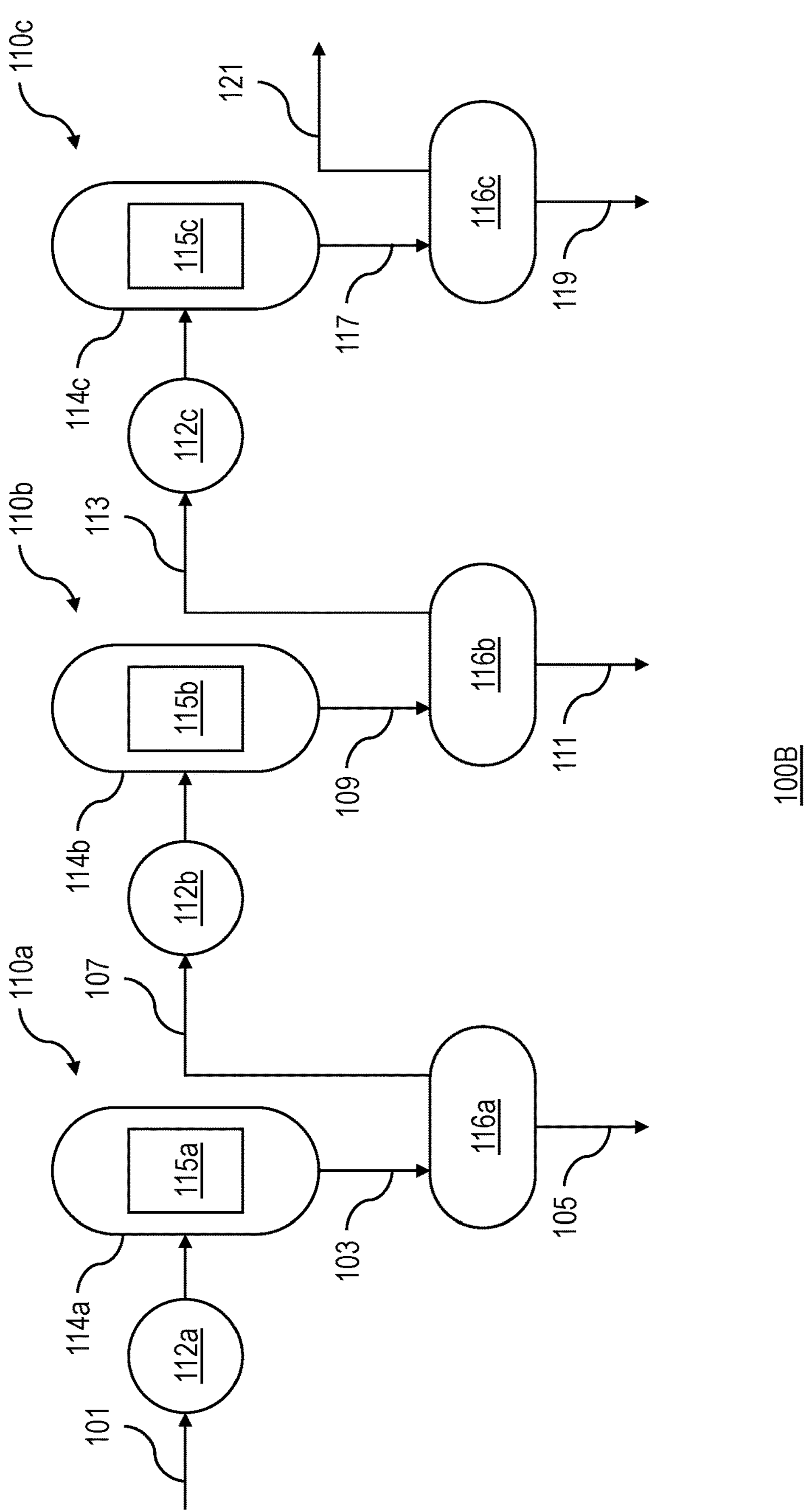
FIG. 1B is a schematic diagram of an example system for producing hydrogen from hydrogen sulfide that includes three reactor trains.

FIG. 1B is a schematic diagram of an example system 100B for producing hydrogen from hydrogen sulfide that includes three reactor trains 110*a*, 110*b*, 110*c*. The reactor train 110*c* is downstream of the reactor train 110*b*. The reactor train 110*c* includes a heater 112*c*, a catalytic reactor 114*c*, and a condenser 116*c*. The reactors trains 110*a*, 110*b*, 110*c* can be substantially similar. For example, the heaters 112*a*, 112*b*, and 112*c* of the reactor trains 110*a*, 110*b*, and 110*c*, respectively, can be substantially similar. As another example, the catalytic reactors 114*a*, 114*b*, and 114*c* of the reactor trains 110*a*, 110*b*, and 110*c*, respectively, can be substantially similar. As another example, the catalysts 115*a*, 115*b*, and 115*c* of the reactor trains 110*a*, 110*b*, and 110*c*, respectively, can be substantially similar. As another example, the condensers 116*a*, 116*b*, and 116*c* of the reactor trains 110*a*, 110*b*, and 110*c*, respectively, can be substantially similar. While similar, the components of the reactor trains 110*a*, 110*b*, 110*c* may vary, for example, in size. While similar, the operating parameters (such as temperature and pressure) of the components of the reactor trains 110*a*, 110*b*, 110*c* may vary. While similar, the specific compositions of the catalysts 115*a*, 115*b*, 115*c* may vary.

The heater 112*c* is downstream of the condenser 116*b*. The heater 112*c* is configured to receive at least a portion of the outlet gas stream 113 from the condenser 116*b*. The heater 112*c* is configured to heat at least the portion of the outlet gas stream 113 to a third preheat temperature. The third preheat temperature is a temperature that is sufficiently high to maintain a desired reaction temperature within the catalytic reactor 114*c*. In some implementations, the third preheat temperature for the heater 112*c* is substantially similar to the preheat temperature for the heater 112*a* and/or the second preheat temperature for the heater 112*b*. In some implementations, the third preheat temperature is in a range of from in a range of from about 450° C. to about 900° C. In some implementations, the desired reaction temperature within the catalytic reactor 114*c* is in a range of from about 450° C. to about 900° C.

The catalytic reactor 114*c* is downstream of the heater 112*c*. The catalytic reactor 114*c* is configured to receive at least a portion of the outlet gas stream 113 from the heater 112*c*. The catalytic reactor 114*c* includes a catalyst 115*c*. The catalytic reactor 114*c* is configured to contact the portion of the outlet gas stream 113 with the catalyst 115*c*. The catalyst 115*c* is configured to, in response to contact with the portion of the outlet gas stream 113, convert at least a portion of the hydrogen sulfide in the portion of the outlet gas stream 113 into hydrogen and sulfur to form a mixed product stream 117. In some implementations, the catalytic reactor 114*c* is configured to convert at least about 30%, at least about 40%, at least about 50%, at least about 60%, at least about 70%, or at least about 80% of the hydrogen sulfide in the outlet gas stream 113 into hydrogen and sulfur. The catalytic reactor 114*c* is configured to discharge the mixed product stream 117. The mixed product stream 117 includes the hydrogen produced in the catalytic reactor 114*c* and the sulfur produced in the catalytic reactor 114*c*. In some implementations, the mixed product stream 117 includes a remaining, unconverted portion of the hydrogen sulfide from the portion of the outlet gas stream 113.

The catalyst 115*c* can have the same composition as or a different composition from the catalyst 115*a* and/or the catalyst 115*b*. In some implementations, the catalyst 115*c* includes a metal sulfide, such as molybdenum sulfide or iron sulfide. In some implementations, the catalyst 115*c* includes an alloy, such as silver-bismuth. In some implementations, the catalyst 115*c* includes a metal oxide, such as vanadium oxide or iron oxide.

The condenser 116*c* is downstream of the catalytic reactor 114*c*. The condenser 116*c* is configured to receive at least a portion of the mixed product stream 117. The condenser 116*c* is configured to cool the portion of the mixed product stream 117 to condense sulfur to form a sulfur stream 119. The condenser 116*c* is configured to cool the portion of the mixed product stream 117 to a temperature that is cooler than the dew point of sulfur. In some implementations, the condenser 116*c* is configured to cool the portion of the mixed product stream 117 to a temperature in a range of from about 120° C. to about 200° C. The condenser 116*c* is configured to discharge the sulfur stream 119. The sulfur stream 119 includes the sulfur that has condensed and separated from the mixed product stream 117. In some implementations, the condenser 116*c* is configured to discharge an outlet gas stream 121. The outlet gas stream 121 can include a remaining, gaseous portion of the mixed product stream 117 after the sulfur has condensed and been separated. For example, the outlet gas stream 121 includes an unconverted portion of the hydrogen sulfide originating from the feed stream 101.

The system 100C can, for example, convert at least about 80%, at least about 85%, at least about 90%, or at least about 95% of the hydrogen sulfide from the feed stream 101 into hydrogen and sulfide. In some implementations, the outlet gas stream 121 has a hydrogen ($H_2$) content in a range of from about 15 vol. % to about 95 vol. %. In some implementations, the outlet gas stream 113 has an $H_2S$ content in a range of from 0 vol. % to about 10 vol. %. In some implementations, the outlet gas stream 121 has a $CO_2$ content in a range of from about 5 vol. % to about 75 vol. %. In some implementations, the outlet gas stream 121 has an $H_2O$ content in a range of from 0 vol. % to about 10 vol. %. In some implementations, the outlet gas stream 121 has an $NH_3$ content in a range of from 0 vol. % to about 10 vol. %. In some implementations, the outlet gas stream 121 has a $CH_4$ content in a range of from 0 vol. % to about 5 vol. %. In some implementations, the outlet gas stream 121 has a COS content in a range of from 0 vol. % to about 5 vol. %. In some implementations, the outlet gas stream 121 has a BTEX content in a range of from 0 vol. % to about 5 vol. %. The outlet gas stream 121 can be processed to separate and produce a high purity hydrogen stream. The high purity hydrogen stream can have an $H_2$ content in a range of from about 98 vol. % to about 100 vol. %. For example, the high purity hydrogen stream can have an $H_2$ content of at least about 98 vol. %, at least about 99 vol. %, or at least about 99.9 vol. %.

Figure 2:
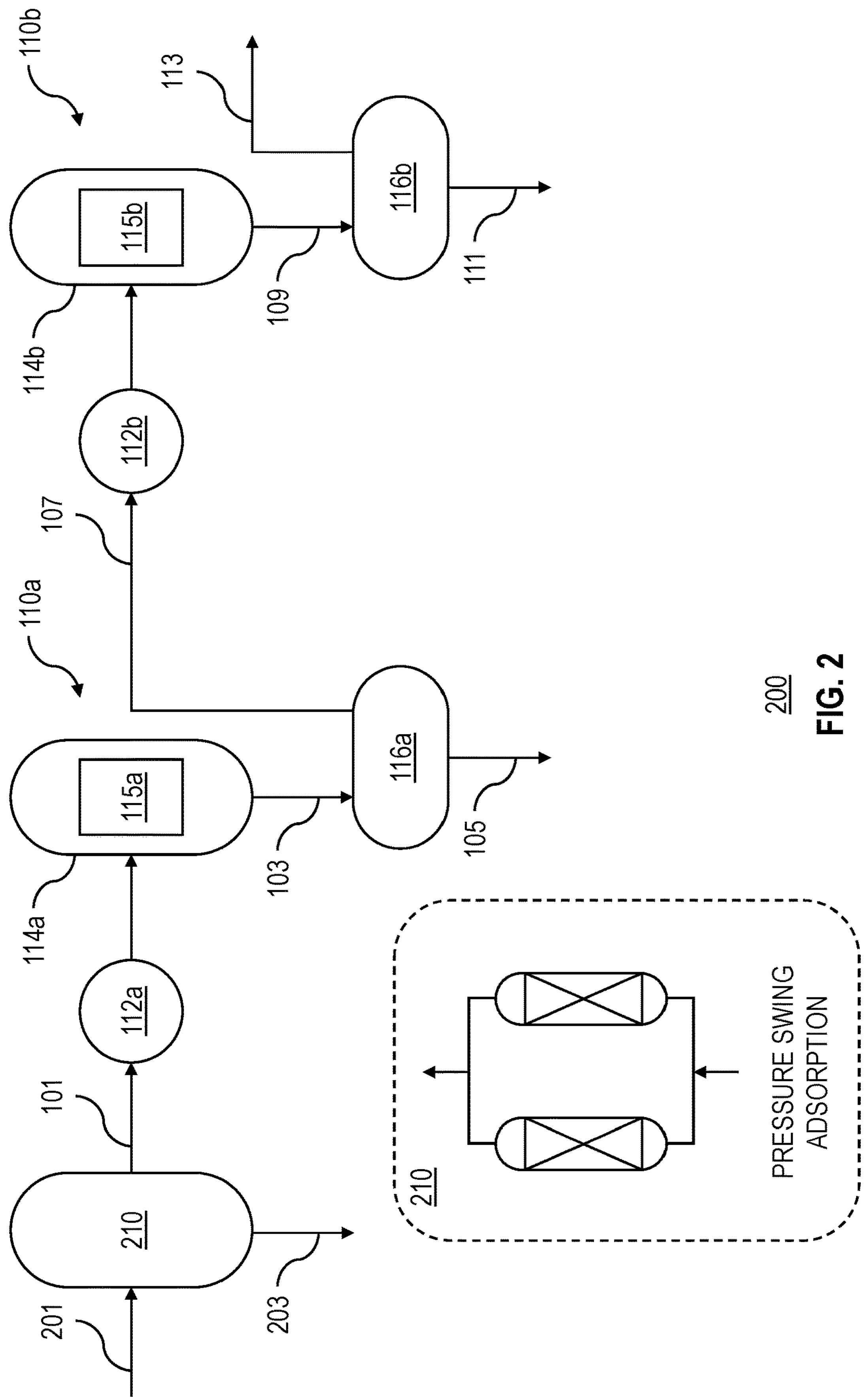
FIG. 2 is a schematic diagram of an example system for producing hydrogen from hydrogen sulfide that includes two reactor trains and a separation unit.

FIG. 2 is a schematic diagram of an example system 200 for producing hydrogen from hydrogen sulfide that includes two reactor trains 110*a*, 110*b* and a separation unit 210 that is upstream of the reactor trains 110*a*. 110*b*. The separation unit 210 is upstream of the heater 112*a*. The separation unit 210 is configured to receive an acid gas stream 201. The acid gas stream 201 includes carbon dioxide and hydrogen sulfide. The acid gas stream 210 can, for example, be a byproduct from natural gas processing. The separation unit 210 includes pressure swing adsorption beds 210*a*, 210*b*. The pressure swing adsorption beds 210*a*, 210*b* are configured to separate at least a portion of the carbon dioxide from the acid gas stream 201 to produce a carbon dioxide stream 203 and the feed stream 101. The carbon dioxide stream 203 includes the carbon dioxide that has separated from the acid gas stream 210. The feed stream 101 includes a remaining portion of the acid gas stream 210 after the carbon dioxide has been separated. The extraction of carbon dioxide from the acid gas stream 201 depends on various factors, such as pressure differential between the beds 210*a*, 210*b* and adsorbent material present in the beds 210*a*, 210*b*. As shown in FIG. 2, for pressure swing adsorption beds, there are at least two vessels which swing across a range of pressures. During an adsorption process, fluid (for example, the acid gas stream 201) flows through the beds in a first direction, and carbon dioxide is adsorbed to the bed(s) to produce the feed stream 101. During a desorption process, fluid flows through the beds in a second direction, and carbon dioxide is desorbed from the bed(s) to produce the carbon dioxide stream 203. Inclusion of the separation unit 210 can increase a concentration of hydrogen sulfide in the feed stream 101 by removing co-species (such as carbon dioxide). Removal of co-species by the separation unit 210 can result in reduced operating and capital costs by reducing a heating duty of the heaters 112*a*, 112*b*, reducing a cooling duty of the condensers 116*a*, 116*b*, and reducing equipment sizes for the reactor trains 110*a*, 110*b* due to the reduced flow rate of the feed stream 101. Further, removal of co-species by the separation unit 210 can allow for the catalytic reactors 114*a*, 114*b* to operate at a cooler temperature (which also relaxes heating and cooling duties of the heaters 112*a*, 112*b* and the condensers 116*a*, 116*b*, respectively), which can enhance the conversion rate of hydrogen sulfide into hydrogen and sulfur as a result of increasing the partial pressure of hydrogen sulfide.

Figure 3:
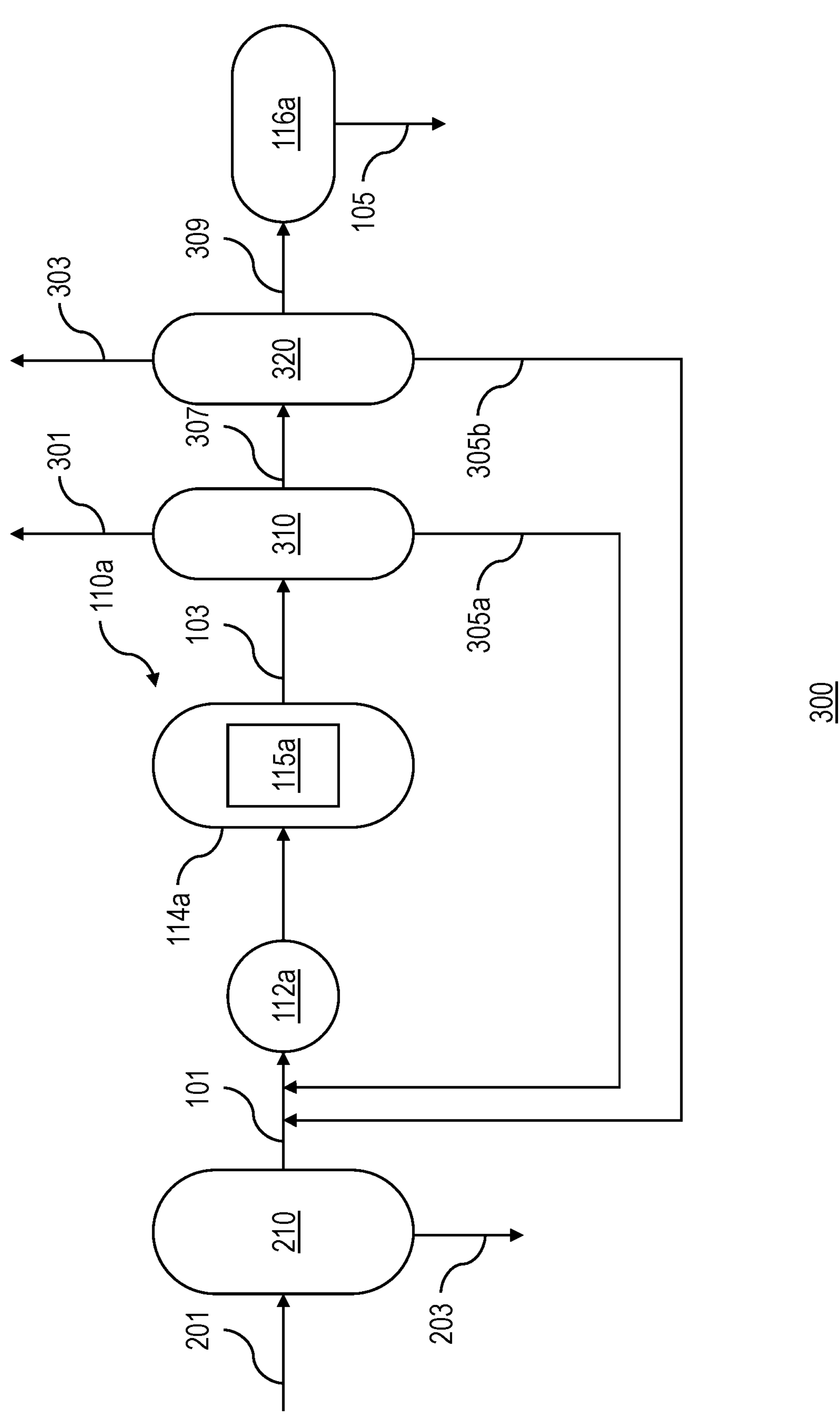
FIG. 3 is a schematic diagram of an example system for producing hydrogen from hydrogen sulfide that includes a reactor train and multiple separators.

FIG. 3 is a schematic diagram of an example system 300 for producing hydrogen from hydrogen sulfide that includes the reactor train 110*a*, the separation unit 210, and multiple separators 310, 320. The separators 310, 320 are downstream of the catalytic reactor 114*a* and upstream of the condenser 116*a*. The separators 310, 320 are configured to separate at least a portion of carbon dioxide, at least a portion of hydrogen, and at least a portion of the remaining, unconverted hydrogen sulfide from the mixed product stream 103. The separators 310, 320 are configured to discharge a carbon dioxide stream 301, a hydrogen stream 303, a first hydrogen sulfide stream 305*a*, and a second hydrogen sulfide stream 305*b*.

The first separator 310 is configured to receive the mixed product stream 103 from the catalytic reactor 114*a*. In some implementations, the first separator 310 is configured to separate at least a portion of carbon dioxide and at least a portion of the remaining, unconverted hydrogen sulfide from the mixed product stream 103 to produce the carbon dioxide stream 301, the first hydrogen sulfide stream 305*a*, and a mixed product stream 307. The carbon dioxide stream 301 can include the carbon dioxide that has separated from the mixed product stream 103 by the first separator 310. The first hydrogen sulfide stream 305*a* can include the hydrogen sulfide that has separated from the mixed product stream 103 by the first separator 310. The mixed product stream 307 can include a remaining portion of the mixed product stream 103 after the carbon dioxide and hydrogen sulfide have been separated by the first separator 310. The first separator 310 can be configured to discharge the carbon dioxide stream 301, the first hydrogen sulfide stream 305*a*, and the mixed product stream 307. The second separator 320 is downstream of the first separator 310. The second separator 320 is configured to receive the mixed product stream 307 from the first separator 310. In some implementations, the second separator 320 is configured to separate at least a portion of hydrogen and at least a portion of the remaining, unconverted hydrogen sulfide from the mixed product stream 307 to produce the hydrogen stream 303, the second hydrogen sulfide stream 305*b*, and a mixed product stream 309. The hydrogen stream 303 can include the hydrogen that has separated from the mixed product stream 307 by the second separator 320. The second hydrogen sulfide stream 305*b* can include the hydrogen sulfide that has separated from the mixed product stream 307 by the second separator 320. The product stream 309 can include a remaining portion of the mixed product stream 307 after the hydrogen and hydrogen sulfide have been separated by the second separator 320. The second separator 320 can be configured to discharge the hydrogen stream 303, the second hydrogen sulfide stream 305*b*, and the product stream 309. The condenser 116*a* can be configured to receive the product stream 309 from the second separator 320. The condenser 116*a* can be configured to cool the product stream 309 to condense sulfur and produce the sulfur stream 105.

In some implementations, the first separator 310 is configured to separate at least a portion of hydrogen and at least a portion of the remaining, unconverted hydrogen sulfide from the mixed product stream 103 to produce the hydrogen stream 303, the first hydrogen sulfide stream 305*a*, and a mixed product stream 307. The hydrogen stream 303 can include the hydrogen that has separated from the mixed product stream 103 by the first separator 310. The first hydrogen sulfide stream 305*a* can include the hydrogen sulfide that has separated from the mixed product stream 103 by the first separator 310. The mixed product stream 307 can include a remaining portion of the mixed product stream 103 after the hydrogen and hydrogen sulfide have been separated by the first separator 310. The first separator 310 can be configured to discharge the hydrogen stream 303, the first hydrogen sulfide stream 305*a*, and the mixed product stream 307. In some implementations, the second separator 320 is configured to separate at least a portion of carbon dioxide and at least a portion of the remaining, unconverted hydrogen sulfide from the mixed product stream 307 to produce the carbon dioxide stream 301, the second hydrogen sulfide stream 305*b*, and a mixed product stream 309. The carbon dioxide stream 301 can include the carbon dioxide that has separated from the mixed product stream 307 by the second separator 320. The second hydrogen sulfide stream 305*b* can include the hydrogen sulfide that has separated from the mixed product stream 307 by the second separator 320. The mixed product stream 309 can include a remaining portion of the mixed product stream 307 after the carbon dioxide and hydrogen sulfide have been separated by the second separator 320. The second separator 320 can be configured to discharge the carbon dioxide stream 301, the second hydrogen sulfide stream 305*b*, and the mixed product stream 309.

In some implementations, the first hydrogen sulfide stream 305*a* is recycled to the catalytic reactor 114*a* to increase overall conversion of hydrogen sulfide into hydrogen and sulfur. For example, the heater 112*a* can be configured to receive and heat the first hydrogen sulfide stream 305*a* along with the feed stream 101. In some implementations, the second hydrogen sulfide stream 305*b* is recycled to the catalytic reactor 114*a* to increase overall conversion of hydrogen sulfide into hydrogen and sulfur. For example, the heater 112*a* can be configured to receive and heat the second hydrogen sulfide stream 305*b* along with the feed stream 101. As another example, the heater 112*a* can be configured to receive and heat the first and second hydrogen sulfide streams 305*a*, 305*b* along with the feed stream 101.

By including the separators 310, 320, the system 300 can omit the second reactor train 110*b* (in comparison to the systems 100A and 100B shown in FIGS. 1A and 1B, respectively). Further, by separating the hydrogen (in the separators 310, 320) prior to condensing the sulfur (in the condenser 116*a*), the risk of potentially converting the hydrogen and sulfur back into hydrogen sulfide can be mitigated and/or eliminated. Additionally, by recycling the hydrogen sulfide exiting the catalytic reactor 114*a* back to the catalytic reactor 114*a*, the overall conversion of hydrogen sulfide into hydrogen and sulfur can be increased in comparison to systems in which hydrogen sulfide is not recycled.

Figure 4:
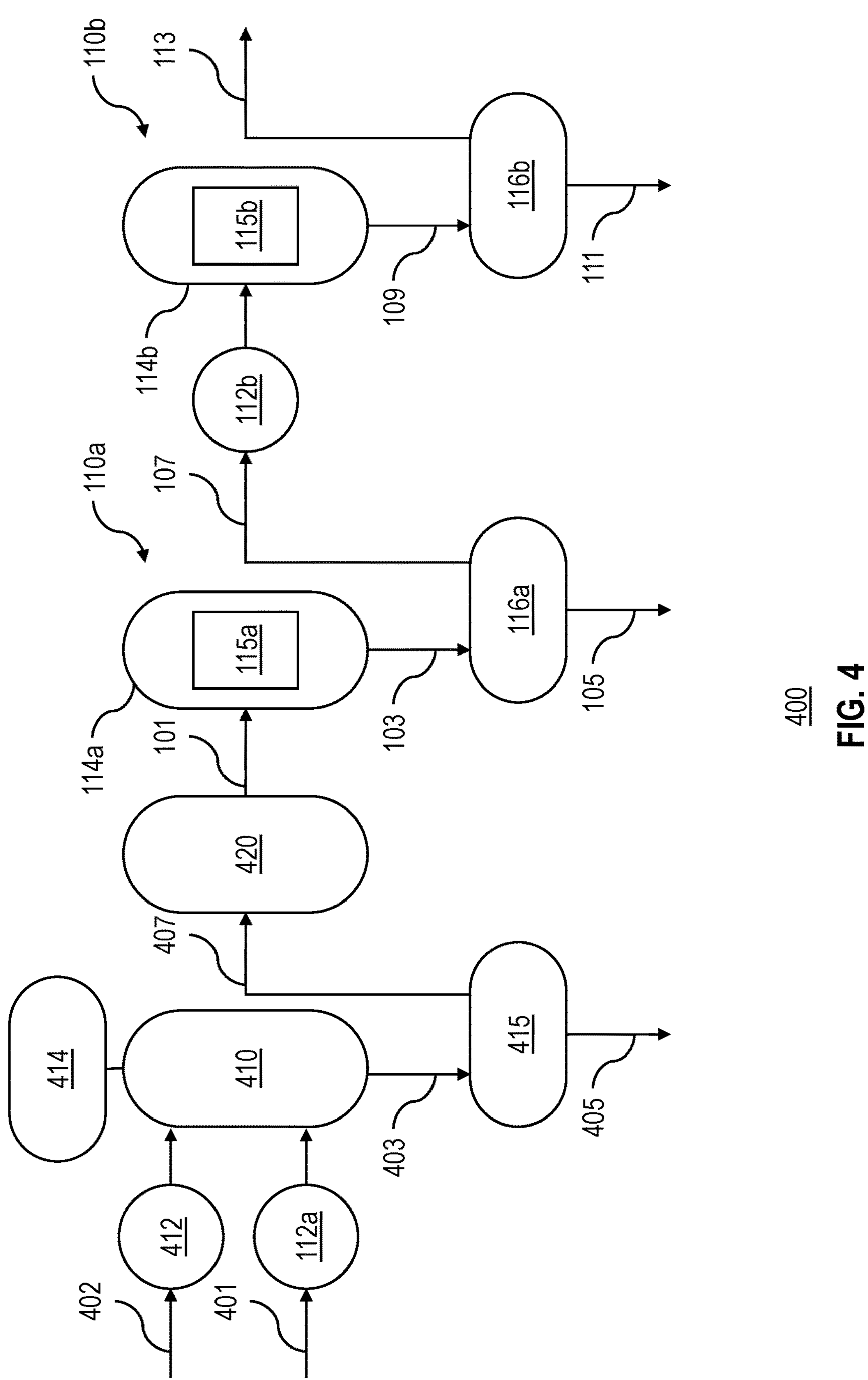
FIG. 4 is a schematic diagram of an example system for producing hydrogen from hydrogen sulfide that includes two reactor trains, a furnace, and a hydrogenation unit.

FIG. 4 is a schematic diagram of an example system 400 for producing hydrogen from hydrogen sulfide that includes the reactor trains 110*a*, 110*b*, a furnace 410, and a hydrogenation unit 420. The furnace 410 is downstream of the heater 112*a* and upstream of the catalytic reactor 114*a*. The hydrogenation unit 320 is downstream of the furnace 410 and upstream of the catalytic reactor 114*a*. The system 400 includes a condenser 415 downstream of the furnace 410 and upstream of the hydrogenation unit 420.

The heater 112*a* is configured the receive an acid gas stream 401. The acid gas stream 401 can be substantially similar to the acid gas stream 201 of system 200 shown in FIG. 2. The heater 112*a* is configured to heat the acid gas stream 401. In some implementations, the heater 112*a* is configured to heat the acid gas stream 401 to a temperature in a range of from about 220° C. to about 260° C. The furnace 410 is an oxidation reactor configured to convert, in the presence of oxygen, at least a portion of the hydrogen sulfide in the acid gas stream 401 to sulfur and sulfur dioxide to form an oxidized stream 403. The furnace 410 can be, for example, a combustion reactor. In some implementations, the furnace 410 is configured to convert at least about 5%, at least about 10%, at least about 15%, at least about 20%, at least about 25%, or at least about 30% of the hydrogen sulfide in the acid gas stream 401 into sulfur and sulfur dioxide. The sulfur dioxide can also react with the hydrogen sulfide in the acid gas stream 401 to produce additional sulfur. The furnace 410 is configured to discharge the oxidized stream 403. The oxidized stream 403 includes the sulfur and the sulfur dioxide formed in the furnace 410. The oxidized stream 403 includes a remaining portion of the acid gas stream 401 that did not react in the furnace 410. In some implementations, oxygen is provided to the furnace 410.

In some implementations, the oxygen is provided to the furnace 410 via an air stream 402. In some implementations, the air stream 402 is heated by an air heater 412 prior to entering the furnace 410. In some implementations, the air stream 402 is provided at a specified flow rate, such that a molar ratio of oxygen in the air stream 402 to hydrogen sulfide in the acid gas stream 401 is in a range of from about 1:4 to about 3:4. In some implementations, the air heater 412 is configured to heat the air stream 402 to a temperature in a range of from about 220° C. to about 260° C. In some cases, the oxidized stream 403 may include a remaining portion of the air stream 402 that did not react in the furnace 410. In some implementations, the system 400 includes a boiler 414 that is coupled to the furnace 410. The boiler 414 can be configured to receive heat that has been generated by the furnace 410. The boiler 414 can be configured to use the heat from the furnace 410 to evaporate water to produce steam. The steam generated by the boiler 414 can be used, for example, as a utility in a different process or to generate power (for example, by a steam turbine).

The condenser 415 is configured to receive the oxidized stream 403 from the furnace 410. The condenser 415 is configured to cool the oxidized stream 403 to condense sulfur to form a sulfur stream 405. The condenser 415 is configured to cool the oxidized stream 403 to a temperature that is cooler than the dew point of sulfur. In some implementations, the condenser 415 is configured to cool the oxidized stream 403 to a temperature in a range of from about 120° C. to about 200° C. The condenser 415 is configured to discharge the sulfur stream 405. The sulfur stream 405 includes the sulfur that has condensed and separated from the oxidized stream 403. The condenser 415 is configured to discharge a hydrogenation feed stream 407. The hydrogenation feed stream 407 can include a remaining, gaseous portion of the oxidized stream 403 after the sulfur has condensed and been separated.

The hydrogenation unit 420 is configured to receive the hydrogenation feed stream 407. The hydrogenation unit 420 is configured to convert at least a portion of the sulfur dioxide in the hydrogenation feed stream 407 back into hydrogen sulfide to form the feed stream 101. The hydrogenation unit 420 can include a hydrogenation catalyst. The hydrogenation unit 420 can be configured to contact the hydrogenation feed stream 407 with the hydrogenation catalyst. The hydrogenation catalyst can be configured to, in response to contact with the hydrogenation feed stream 407, convert at least a portion of the sulfur dioxide in the hydrogenation feed stream 407 into hydrogen sulfide to form the feed stream 101. In some implementations, the hydrogenation catalyst is a cobalt-molybdenum sulfide catalyst. In some implementations, additional (for example, make up) hydrogen is supplied to the hydrogenation unit 420 for converting the sulfur dioxide into hydrogen sulfide. In some implementations, the hydrogenation unit 420 is configured to convert at least 50%, at least 60%, at least 70%, at least 80%, at least 90%, at least 95%, at least 99%, or at least 99.9% of the sulfur dioxide in the hydrogenation feed stream 407 back into hydrogen sulfide. The feed stream 101 includes the hydrogen sulfide produced in the hydrogenation unit 420. In some implementations, the $H_2S$ content of the feed stream 101 exiting the hydrogenation unit 420 is in a range of from about 10 vol. % to about 70 vol. %. The hydrogenation unit 420 is configured to discharge the feed stream 101. The feed stream 101 can flow from the hydrogenation unit 420 to the catalytic reactor 114*a*.

By including the furnace 410, contaminants in the acid gas stream 401 can be cracked and/or oxidized prior to converting the hydrogen sulfide into hydrogen and sulfur. The presence of contaminants such as BTEX may hinder the conversion of hydrogen sulfide into hydrogen and sulfur, so cracking and/or oxidizing such contaminants in the furnace 410 can improve overall production efficiency of hydrogen by the system 400. Excess heat generated by the furnace 410 can be recovered and used, for example, to provide steam to other processes or to generate power.

Figure 5:
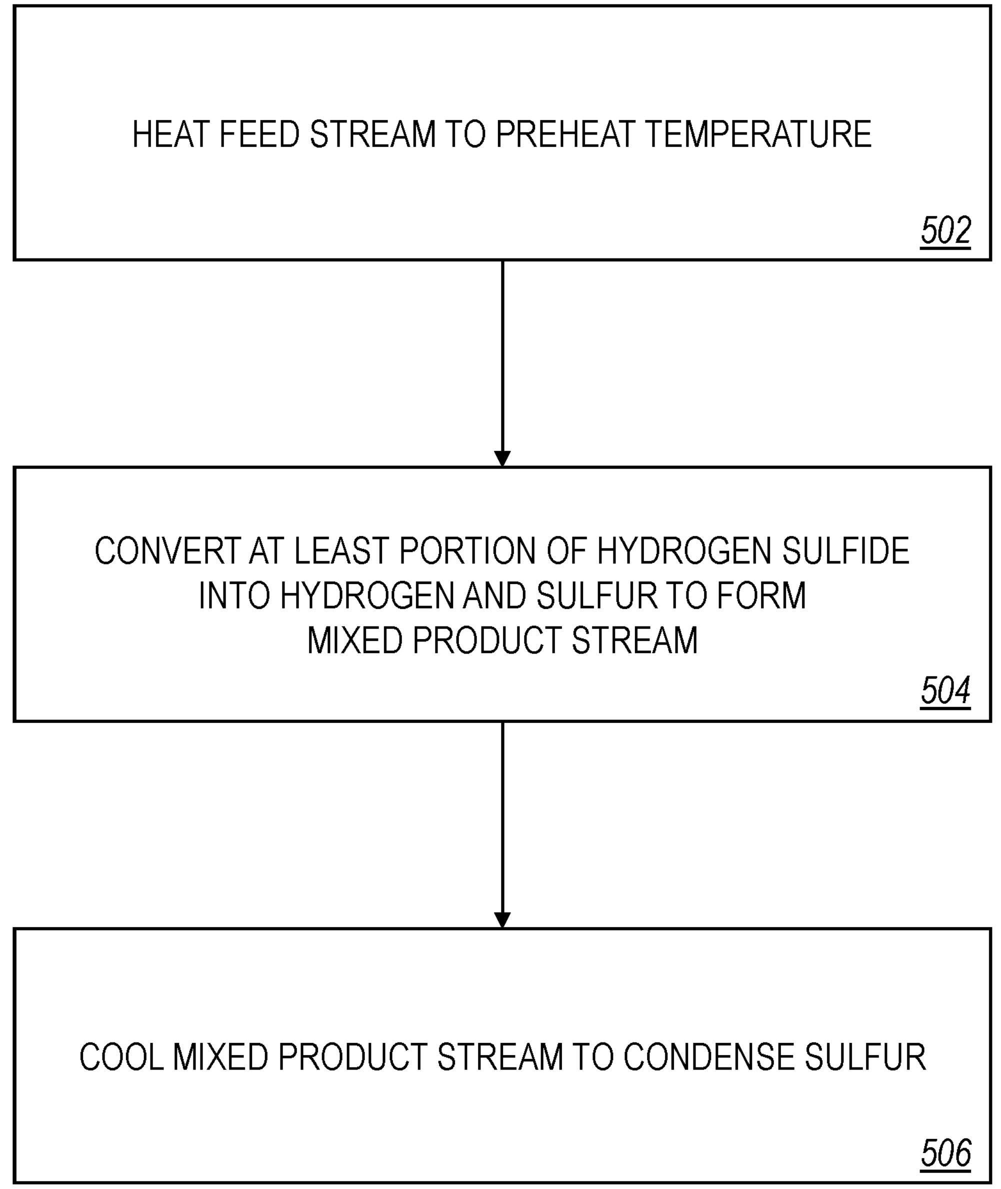
FIG. 5 is a flow chart of an example method for producing hydrogen from hydrogen sulfide.

FIG. 5 is a flow chart of an example method 500 for producing hydrogen from hydrogen sulfide. The method 500 can, for example, be implemented by any of the systems 100A, 100B, 200, 300, or 400. At block 502 a feed stream (such as the feed stream 101, the acid gas stream 201, or the acid gas stream 401) is heated to a preheat temperature. The feed stream at block 502 includes hydrogen sulfide. In some implementations, the preheat temperature at block 502 is in a range of from in a range of from about 450° C. to about 900° C. Heating the feed stream at block 502 can, for example, be implemented by the heater 112*a*. After heating the feed stream at block 502, at least a portion of the hydrogen sulfide in the feed stream is converted into hydrogen and sulfur to form a mixed product stream (such as the mixed product stream 103) at block 504. Converting the hydrogen sulfide into hydrogen and sulfur at block 504 can, for example, be implemented by the catalytic reactor 114*a*. The mixed product stream formed at block 504 includes the sulfur produced at block 504, the hydrogen produced at block 504, and a remaining portion of the feed stream that did not get converted at block 504 (for example, a remaining, unconverted portion of the hydrogen sulfide from the feed stream). The preheat temperature at block 502 can be a temperature that is sufficiently hot to maintain a desired reaction temperature while converting the hydrogen sulfide into hydrogen and sulfur at block 504. At block 506, at least a portion of the mixed product stream (produced at block 504) is cooled to condense the sulfur to form a sulfur stream (such as the sulfur stream 105). The sulfur stream produced at block 506 includes the sulfur that has condensed and separated from the mixed product stream at block 506. Cooling the mixed product stream at block 506 can, for example, be implemented by the condenser 116*a*.

While this specification contains many specific implementation details, these should not be construed as limitations on the scope of what may be claimed, but rather as descriptions of features that may be specific to particular implementations. Certain features that are described in this specification in the context of separate implementations can also be implemented, in combination, in a single implementation. Conversely, various features that are described in the context of a single implementation can also be implemented in multiple implementations, separately, or in any sub-combination. Moreover, although previously described features may be described as acting in certain combinations and even initially claimed as such, one or more features from a claimed combination can, in some cases, be excised from the combination, and the claimed combination may be directed to a sub-combination or variation of a sub-combination.

As used in this disclosure, the terms "a," "an," or "the" are used to include one or more than one unless the context clearly dictates otherwise. The term "or" is used to refer to a nonexclusive "or" unless otherwise indicated. The statement "at least one of A and B" has the same meaning as "A, B, or A and B." In addition, it is to be understood that the phraseology or terminology employed in this disclosure, and not otherwise defined, is for the purpose of description only and not of limitation. Any use of section headings is intended to aid reading of the document and is not to be interpreted as limiting; information that is relevant to a section heading may occur within or outside of that particular section.

As used in this disclosure, the term "about" or "approximately" can allow for a degree of variability in a value or range, for example, within 10%, within 5%, or within 1% of a stated value or of a stated limit of a range.

As used in this disclosure, the term "substantially" refers to a majority of, or mostly, as in at least about 50%, 60%, 70%, 80%, 90%, 95%, 96%, 97%, 98%, 99%, 99.5%, 99.9%, 99.99%, or at least about 99.999% or more.

Values expressed in a range format should be interpreted in a flexible manner to include not only the numerical values explicitly recited as the limits of the range, but also to include all the individual numerical values or sub-ranges encompassed within that range as if each numerical value and sub-range is explicitly recited. For example, a range of "0.1% to about 5%" or "0.1% to 5%" should be interpreted to include about 0.1% to about 5%, as well as the individual values (for example, 1%, 2%, 3%, and 4%) and the sub-ranges (for example, 0.1% to 0.5%, 1.1% to 2.2%, 3.3% to 4.4%) within the indicated range. The statement "X to Y" has the same meaning as "about X to about Y," unless indicated otherwise. Likewise, the statement "X, Y, or Z" has the same meaning as "about X, about Y, or about Z," unless indicated otherwise.

Particular implementations of the subject matter have been described. Other implementations, alterations, and permutations of the described implementations are within the scope of the following claims as will be apparent to those skilled in the art. While operations are depicted in the drawings or claims in a particular order, this should not be understood as requiring that such operations be performed in the particular order shown or in sequential order, or that all illustrated operations be performed (some operations may be considered optional), to achieve desirable results. In certain circumstances, multitasking or parallel processing (or a combination of multitasking and parallel processing) may be advantageous and performed as deemed appropriate.

Moreover, the separation or integration of various system modules and components in the previously described implementations should not be understood as requiring such separation or integration in all implementations, and it should be understood that the described components and systems can generally be integrated together or packaged into multiple products.

Accordingly, the previously described example implementations do not define or constrain the present disclosure. Other changes, substitutions, and alterations are also possible without departing from the spirit and scope of the present disclosure.

What is claimed is:

1. A method comprising:

heating a feed stream comprising hydrogen sulfide to a preheat temperature;

after heating the feed stream, converting at least a portion of the hydrogen sulfide in the feed stream into hydrogen and sulfur to form a mixed product stream comprising the hydrogen, the sulfur, and a remaining, unconverted portion of the hydrogen sulfide, wherein the preheat temperature is a temperature that is sufficiently hot to maintain a desired reaction temperature while converting at least the portion of the hydrogen sulfide in the feed stream into hydrogen and sulfur;

cooling at least a portion of the mixed product stream to condense the sulfur to form a sulfur stream comprising the sulfur that has condensed from the portion of the mixed product stream;

receiving, by a plurality of pressure swing adsorption beds, an acid gas stream comprising carbon dioxide and hydrogen sulfide; and separating, by the plurality of pressure swing adsorption beds, at least a portion of the carbon dioxide from the acid gas stream to produce a carbon dioxide stream and the feed stream, the carbon dioxide stream comprising the carbon dioxide that has separated from the acid gas stream, the feed stream comprising a remaining portion of the acid gas stream.

2. The method of claim 1, comprising separating at least a portion of the carbon dioxide and at least a portion of the remaining, unconverted portion of the hydrogen sulfide from the mixed product stream to produce a second carbon dioxide stream, a hydrogen sulfide stream, and a second mixed product stream, wherein the second carbon dioxide stream comprises the carbon dioxide that has separated from the mixed product stream, the hydrogen sulfide stream comprises the hydrogen sulfide that has separated from the mixed product stream, and the second mixed product stream comprises a remaining portion of the mixed product stream.

3. The method of claim 2, comprising combining the hydrogen sulfide stream with the feed stream, wherein heating the feed stream comprises heating the hydrogen sulfide stream along with the feed stream.

4. The method of claim 3, comprising separating at least a portion of the hydrogen and at least a portion of the hydrogen sulfide from the second mixed product stream to produce a hydrogen stream, a second hydrogen sulfide stream, and a product stream, wherein the hydrogen stream comprises the hydrogen that has separated from the second mixed product stream, the second hydrogen sulfide stream comprises the hydrogen sulfide that has separated from the second mixed product stream, and the product stream comprises a remaining portion of the second mixed product stream.

5. The method of claim 4, comprising combining the second hydrogen sulfide stream with the hydrogen sulfide stream and the feed stream, wherein heating the feed stream comprises heating the second hydrogen sulfide stream along with the hydrogen sulfide stream and the feed stream.

6. The method of claim 5, wherein cooling at least the portion of the mixed product stream comprises cooling the product stream to condense the product stream and produce the sulfur stream.

7. The method of claim 1, comprising converting, in the presence of oxygen, at least a portion of the hydrogen sulfide in the feed stream to sulfur and sulfur dioxide to form a second feed stream.

8. The method of claim 7, comprising:

cooling the second feed stream to condense sulfur to form a second sulfur stream and a third feed stream, wherein the second sulfur stream comprises the sulfur that has condensed from the second feed stream, and the third feed stream comprises a remaining, gaseous portion of the second feed stream; and converting at least a portion of the sulfur dioxide of the third feed stream back into hydrogen sulfide to form a fourth feed stream, wherein converting the portion of the hydrogen sulfide in the feed stream into hydrogen and sulfur comprises converting at least a portion of the hydrogen sulfide in the fourth feed stream into hydrogen and sulfur to form the mixed product stream.

9. The method of claim 8, comprising heating an oxidizing stream comprising oxygen, wherein the oxygen present while converting at least the portion of the hydrogen sulfide in the feed stream to sulfur and sulfur dioxide is provided by the oxidizing stream after the oxidizing stream has been heated.

* * * * *